United States Patent [19]

Zinner

[11] Patent Number: 5,031,492
[45] Date of Patent: Jul. 16, 1991

[54] BASIC TOOL HOLDER FOR ATTACHMENT IN AN ACCOMMODATING RECESS, PARTICULARLY A TURRET HEAD

[75] Inventor: Karl Zinner, Nuremberg, Fed. Rep. of Germany

[73] Assignee: Zinner GmbH Präzisionswerkzeuge, Nuremberg, Fed. Rep. of Germany

[21] Appl. No.: 485,200

[22] Filed: Feb. 26, 1990

[30] Foreign Application Priority Data

Apr. 6, 1989 [DE] Fed. Rep. of Germany ... 8904239[U]

[51] Int. Cl.$^5$ ............................................. B23B 29/00
[52] U.S. Cl. ..................................... 82/158; 407/107; 407/41
[58] Field of Search ................... 82/158; 407/107, 108, 407/109, 34, 41

[56] References Cited

U.S. PATENT DOCUMENTS

| | | | |
|---|---|---|---|
| 3,136,030 | 6/1904 | Jarrett | 82/158 |
| 3,436,799 | 4/1969 | Kopy | 407/107 |
| 3,497,935 | 3/1970 | Bowling | 407/108 |
| 4,332,513 | 6/1982 | Gowanlock | 82/158 |
| 4,658,875 | 4/1987 | Grabovac | 82/158 |

*Primary Examiner*—Frederick R. Schmidt
*Assistant Examiner*—Lawrence Cruz
*Attorney, Agent, or Firm*—Jordan & Hamburg

[57] ABSTRACT

A basic tool holder for attachment in an accommodating recess of a tool support, particularly a turret head, with a base part, to which can be attached a work-holding device by one or several clamping means, between which the tool is clamped. A component of the clamping force, directed radially towards the tool support, is produced by at least one abutment face between the base part and the work-holding device forming a wedge-shaped incline for the clamping means.

4 Claims, 2 Drawing Sheets

BASIC TOOL HOLDER FOR ATTACHMENT IN AN ACCOMMODATING RECESS, PARTICULARLY A TURRET HEAD

BACKGROUND OF THE INVENTION

The invention relates to a basic tool holder for attachment in an accommodating recess of a tool support, particularly a turret head, having a base part, to which can be attached a work-holding device by one or several clamping means, between which the tool is clamped. A component of the clamping force, directed radially towards the tool support, is produced by at least one abutment face between the base part and the work-holding device forming a wedge-shaped incline for the clamping means.

In basic holders of this type, the wedge-shaped incline for generating the radial component of the clamping force on the tool is formed by an obliquely rising elevation on the surface of the base part, however, with the disadvantage of additional material consumption for the elevation during the manufacture. In turret lathes, it is customary to clamp the base part of the basic holder by means of a clamping screw in the accommodating recess of the turret head. The clamping screw is in contact with a threaded borehole in the tool support and protrudes laterally or tangentially to the tool support into the recess. However, in known embodiments, the elevation or the hump for forming the wedge-shaped incline lies radially outside of the clamping screw, so that this screw is partially covered by the elevation and that therefore access to it for actuating it is very difficult.

Consequently, the invention providing a basic tool holder for tool supports, which avoids the aforementioned disadvantages, is easily manufactured, requires little material and is readily handled, particularly within a tool support receptacle. To solve the aforementioned problem, a basic holder with the initially mentioned characteristics is proposed, the abutment surface being disposed within an indentation in the base part.

SUMMARY OF THE INVENTION

Structurally and technically, the indentation can easily be formed. It provides space for the abutment surface or the wedge-shaped incline, unnecessary, additional consumption of material being avoided. At the same time, the effective production of a component of clamping force, which is exerted on the clamped tool and directed to the interior of the tool support and which increases with increasing actuation of the clamping means, is retained. In all, a low-cost tool cassette, which holds the tool reliably, can be produced from a two-part basic holder and a tool or a tool holder holding a tool that is clamped in the basic holder; the inventive tool cassette, pushed into the revolver receptacle is then handled and particularly secured comfortably.

An advantageous further development of the invention consists therein that the abutment face is constructed as a side wall of a groove of the base part. If necessary, the groove runs tangentially with respect to the tool support, in order to impart the correct (radial) direction to the wedge-shaped incline or the clamping force component. A further refinement of this concept consists therein that the indentation is formed as a groove with a V-shaped cross section and the abutment face then forms the outer one (as seen from the tool support) of the two legs of this V cross section. For practical purposes, this is a particularly appropriate realization, because, on the one hand, the V cross section can easily be formed and, on the other, the legs of the V cross section can fulfill the function of the wedge-shaped incline.

In order to be able to turn the clamping screw unimpededly to fasten the base part when the base part of the basic holder has moved into the tool support receptacle, the base part is provided according to a different development of the invention with a gripper surface disposed between the tool support and the indentation as a seat for the actuating head of the clamping screw which, for example, passes through the side wall of the recess and protrudes to the base part. With this, the side of the base part facing the work-holding device of the base holder can be constructed largely flat or level, the flat surface being interrupted only by the indentation with the wedge-shaped incline.

Further characteristics, details and advantages of the invention arise out of the following description of a preferred example of the operation of the invention as well as from the accompanying drawings.

DESCRIPTION OF THE PREFERRED EMBODIMENTS

Figure 1:
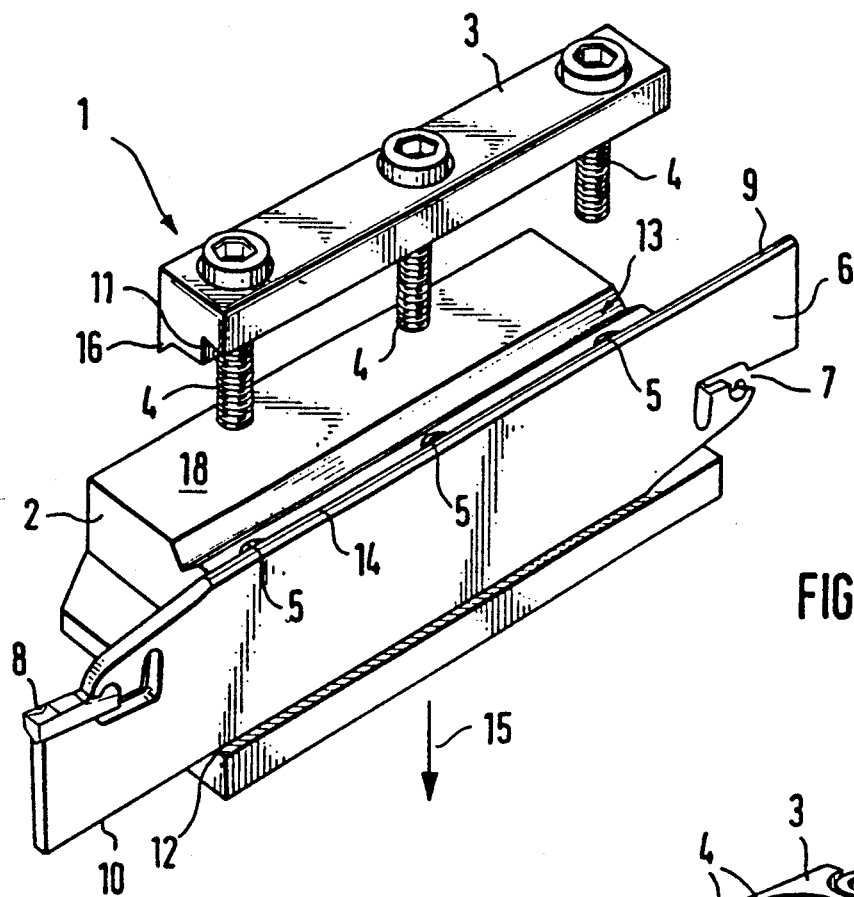
FIG. 1 shows a perspective and pulled apart representation of an inventive basic holder as well as of an associated pluging sword with a clamped, exchangeable cutter bit.
Figure 2:
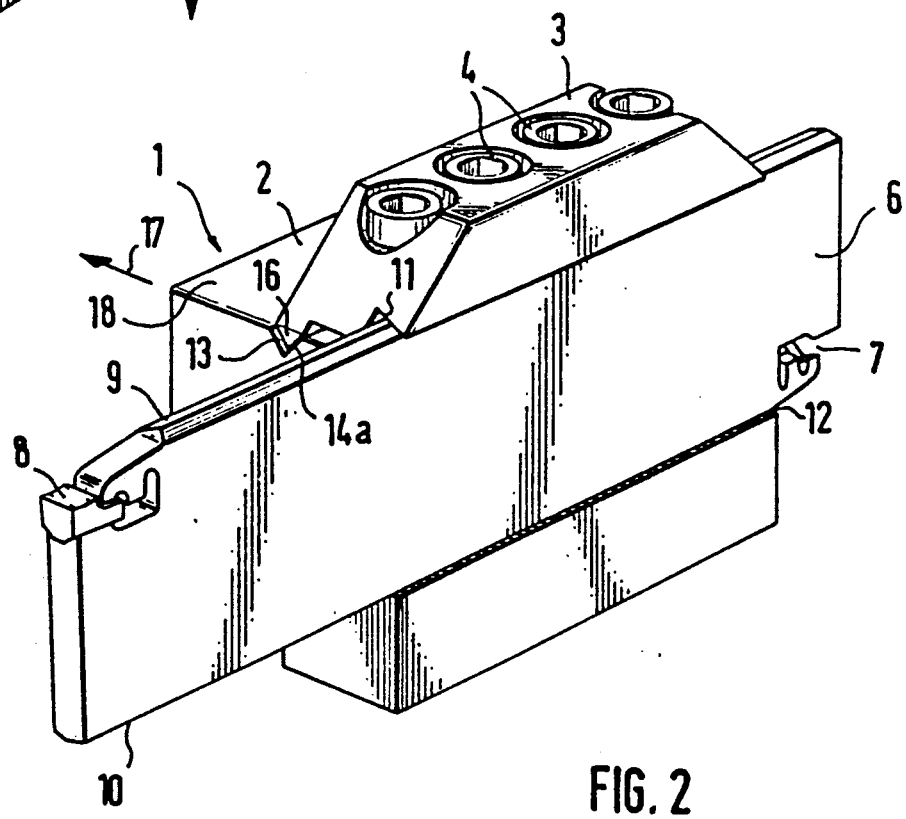
FIG. 2 shows a perspective representation of the assembled tool cassette of FIG. 1.

According to FIGS. 1 and 2, the inventive basic holder 1 consists of a base part 2 which is the lower part in the representation, and a work-holding device 3, which is the upper part in the representation. The basic holder is interspersed with clamping means 4 constructed as screws. For their engagement, the clamping means or clamping screws 4 are provided with complementary tapped holes 5 in the base part 2 on that side of the base part 2 facing the work-holding device 3. In the example drawn, a narrow, panel-shaped tool holder 6, with a clamping slot 7 that can be propped open for exchangeable cutter bits 8 is disposed between the base part 2 and the work-holding device 3.

As can be seen, above all from FIG. 2, the tool holder 6 is constructed so that it can be clamped between the base part 2 and the work-holding device 3 and against a mounting wall 2a (FIG. 3) on the base part 2. For this purpose, the work-holding device 3, overlapping the upper narrow edge 9 of the plunging sword 6, is placed on the base part 2 and the clamping screws 4, leading through the holes in the work-holding device 3, are screwed into their respective tapped holes 5. The upper and lower narrow edges 9 and 10 respectively of the tool holder 6 are in each case encompassed by an upper projection 11, which is integrally formed to the clamping part and by a lower projection 12, respectively, which is integrally formed to the base part 2. For this purpose, the projecting parts 11 and 12 are in each case provided with an inclined support surface facing the tool holder. Moreover, the side of the base part facing the work-holding device 3 is formed with an indentation or groove 13 with an approximately V-shaped cross section traversing its whole length. The leg 14 of the V cross section closest to the tool holder 6 forms an acute angle with the direction of action 15 of the force of the clamping screws 4. On its radial inner side away from the tool holder 6, the work-holding part 3 has an elongated projection 16 with a preferably complementary shape adapted to the V groove 13, so that the projection 16 can move into or lie against the groove 13 almost completely. At the same time, in particular, an abutment face 14a common to the base part 2 and the work-holding device 3, is formed (see FIG. 2). When the base part 2 is separated from the work-holding device 3, this abutment face 14a corresponds to the outer leg of the V (see FIG. 1). For the clamping screws 4 or the forces they exert, the common abutment face 14a provides a wedge-shaped incline at which the component of clamping force 17, directed at right angles to the tool holder 6, results from the effects of the force 15 of the clamping screws 4. In effective combination with the upper one, this produces at the projection 11 with the canted underside, by means of which the work-holding device 3 overlaps the tool holder 6, a clamping of the tool holder with the associated tool or cutter bit 8 that is secure also in the radial direction of a possible turret head (see FIG. 3). An extended, flat gripper surface 18, the mode of functioning of which can be seen from FIG. 3, adjoins the side of the V groove 13 that is away from the tool holder 6 while a flat upper surface section 17 adjoins the other side of the V groove 13 and extends to a front edge 17a as shown in FIG. 3.

A comparison of the example of the operation of FIG. 1 with that of FIG. 2 shows that it is within the scope of the invention to provide three clamping screws as well as four clamping screws 4; moreover, the elongated projection 16 at the work-holding device 3 can have either only one canted abutment face (FIG. 1), or several, for example, two prismatic abutment faces as a seat in the groove 13.

Figure 3:
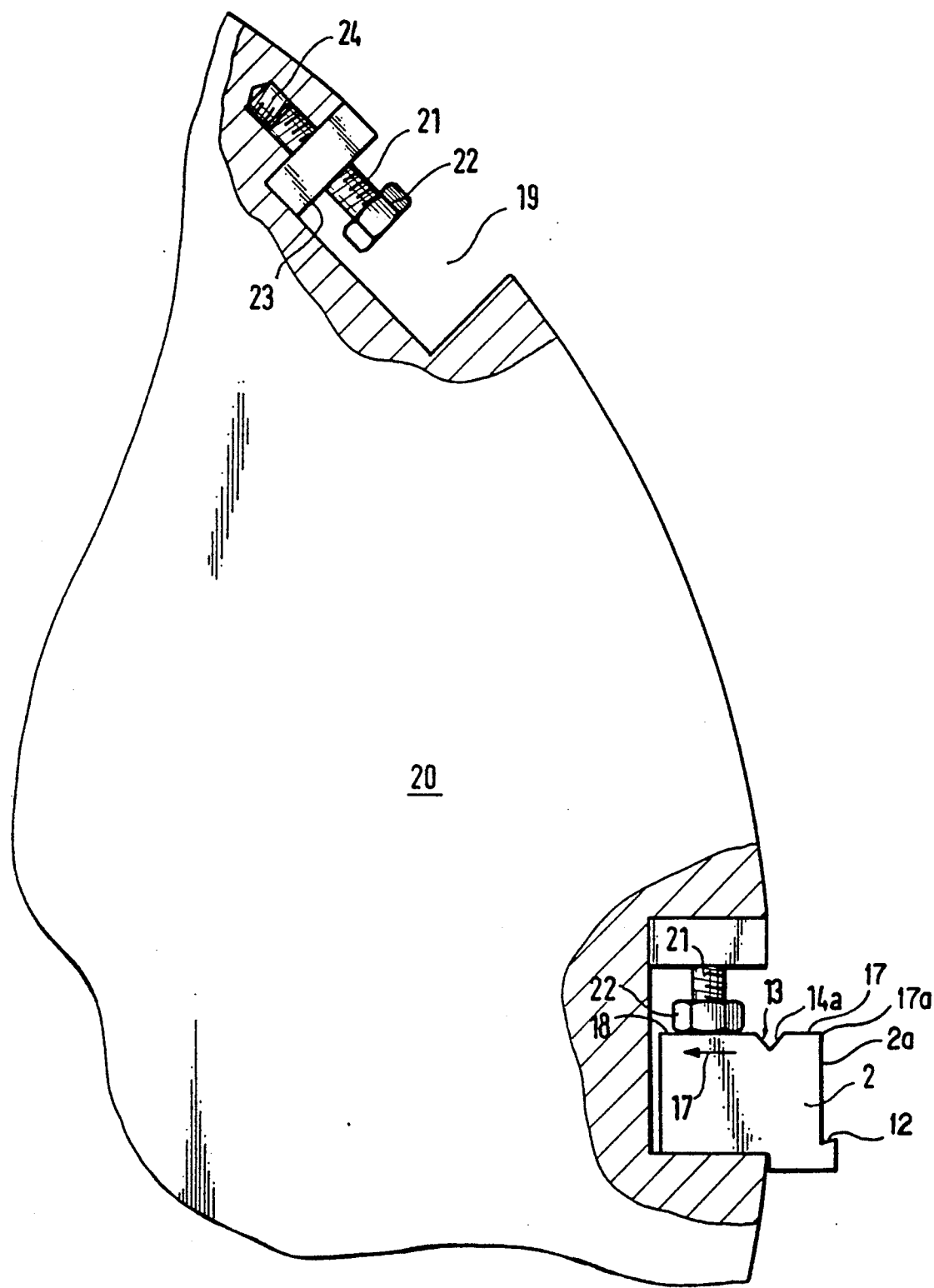
FIG. 3 shows a front view of a sectionally represented turret head with an inserted base part of the inventive basic holder.

The nature of the attachment of the basic holder or of the associated base part 2 in the accommodating recess 19 of a turret head 20 of a (not shown) turret lathe is illustrated in FIG. 3. A clamping screw 21, which is directed approximately tangentially with respect to the turret head 20, protrudes with its actuating head 22 laterally into the recess 19. At the same time, it penetrates a side wall 23 of the accommodating recess 19 and is adjustably fixed thereby being turned in an appropriate tapped hole. The actuating head 22 of the clamping screw 21 serves to turn it. As it is turned out of the tapped hole 24 in the side wall 23, the actuating head 23 comes up against the clamping surface 18 next to the groove 13 with the wedge-shaped inclined surface 14a. Since the wedge-shaped inclined surface 14a lies within the groove 13, that is, since it is recessed, the actuating head 22 of the clamping screw 21 for the adjusting tool is easily accessible. Therefore, the base part 2 is readily fastened in or detached from the accommodating recess 19 with this inventive type of arrangement of the wedge-shaped inclined surface 14a, if the complementary elongated projection 16 of the work-holding device 3 does not yet lie adjacent to the wedge-shaped inclined surface 14a. The component 17 of the clamping force, which would result, because of the wedge-shaped inclined surface 14a or the abutment face 14 (compare FIG. 1), when the work-holding device 3 lies against the base part 2 and the clamping screws 4 are tightened, is shown in FIG. 3.

I claim:

1. The combination comprising a rotatable turret head and a basic holder which holds a tool holder and which is mounted on a new rotatable turret head, said turret head having a recess for receiving said basic holder, said basic holder comprising a base part and a work holding device along with clamping means mounting said work holding device on said base part, said base part having a flat upper surface and a flat mounting wall perpendicular to said flat upper surface, said flat mounting wall having a lower projection, said tool holder having one flat side disposed against said flat mounting wall of said basic holder and a lower edge disposed against said lower projection, said flat upper surface having a V-shaped groove which divides said flat upper surface into a flat gripper surface and a flat upper surface section which is co-planar with said flat gripper surface, said work holding device having a projection disposed within said V-shaped groove, said V-shaped groove having a first abutment surface engaged by a second abutment surface on said projection such that when said clamping means clamps said work holding device onto said base part, said first and second abutment surfaces are engaged to produce a component clamping force extending in a direction generally perpendicular to said flat mounting wall, said work holding device having an upper projection with an inclined surface which is disposed at an acute angle relative to said one flat side of said tool holder, said tool holder having an upper edge engageable by said inclined surface such that said upper projection with its inclined surface clamps said tool holder against said mounting wall and against said lower projection on said mounting wall when said clamping means clamps said holding device onto said base part, said recess in said turret head having top and bottom walls along with an inner wall, a clamping screw in said top wall, said clamping screw having an actuating head extending into said recess, said basic holder being disposed in said recess such that said flat gripper surface is disposed between said inner wall of said recess and said V-shaped groove, said actuating head of said clamping screw engaging said flat gripper surface to thereby clamp said basic holder in said recess, said actuating head being readily accessible within said recess when said work holding device, said clamping means, and said tool holder have been removed form said base part.

2. The combination according to claim 1, wherein said lower projection has an engageable surface disposed at an acute angle relative to said flat mounting wall, said lower edge of said tool holder abutting said engageable surface.

3. The combination according to claim 1, wherein said flat upper surface section intersects said flat mounting wall along a line of undersection which defines a front edge of said flat upper surface section, said flat upper surface section being a planar surface extending between said front edge and said V-shaped groove, thereby providing a space above said flat upper surface section providing ready access to said actuating head of said clamping screw.

4. The combination according to claim 1, wherein said actuating head is a bolt head.

* * * * *